UNITED STATES PATENT OFFICE.

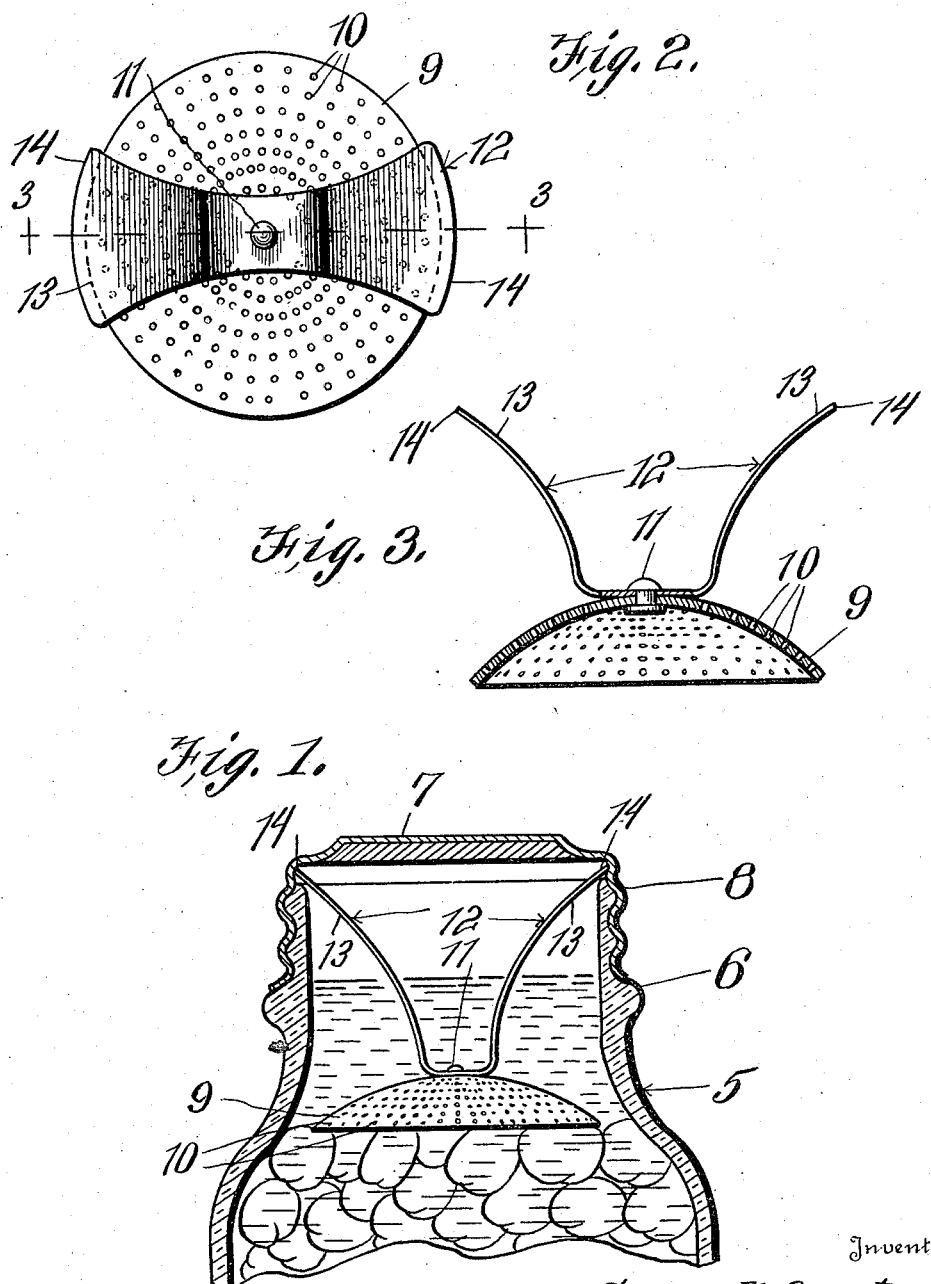

GEORGE N. ARMSTRONG, OF ARGENTA, ARKANSAS, ASSIGNOR OF ONE-THIRD TO WILLIAM M. McCLOY AND ONE-THIRD TO ERNEST S. VAIL, BOTH OF PULASKI COUNTY, ARKANSAS.

ATTACHMENT FOR FRUIT-JAR COVERS.

1,183,714.      Specification of Letters Patent.      Patented May 16, 1916.

Application filed July 27, 1915. Serial No. 42,208.

*To all whom it may concern:*

Be it known that I, GEORGE N. ARMSTRONG, a citizen of the United States, residing at Argenta, in the county of Pulaski and State of Arkansas, have invented certain new and useful Improvements in Attachments for Fruit-Jar Covers, of which the following is a specification.

My invention relates to improvements in means for holding or retaining fruits or vegetables beneath the surface of the preserving liquid, within the container, such as a jar or the like.

An important object of the invention is to provide a device of the above mentioned character, which is suitably yieldable whereby it will not crush or unduly injure the contents of the receptacle, by contact therewith.

A further object of the invention is to provide means of the above mentioned character, adapted to be detachably secured to the cover of the receptacle, to be normally carried thereby, and to be separated therefrom for cleaning it.

A further object of the invention is to provide means of the above mentioned character, which are simple in construction, inexpensive to manufacture, strong and durable.

Other objects and advantages of the invention will be apparent during the course of the following description.

In the accompanying drawings forming a part of this specification and in which like numerals are employed to designate like parts throughout the same, Figure 1 is a central vertical longitudinal sectional view through the upper portion of a jar, showing the device arranged therein, Fig. 2 is a plan view of the device removed, and, Fig. 3 is a transverse sectional view taken on line 3—3 of Fig. 2.

In the drawings, wherein for the purpose of illustration is shown a preferred embodiment of my invention, the numeral 5 designates a jar, having an exteriorly screw-threaded neck 6, detachably receiving thereon a cap 7, having screw-threads 8.

My improved device embodies a preferably circular depression member or tray 9, preferably curved in cross-section and having its concave side arranged lowermost. This member may be formed of any suitable material and is provided with apertures 10, as shown. The member or tray 9 is provided centrally thereof with an opening for receiving an attaching element or rivet 11, passing through an opening in a curved or approximately U-shaped leaf-spring 12. This leaf-spring, while constructed suitably stiff, is comparatively resilient, and has its arms 13 curved inwardly, whereby they are free to yield when pressure is applied to the member 9 to move it upwardly as by contact with the contents of the jar. The arms 13 are also adapted to be moved laterally and the same are inserted within the cap 7 and when released expand therein so that their curved ends 14 will fit in the upper portion of the cap, as shown at Fig. 1. The spring 12 is preferably tapered, decreasing in width toward its center, as clearly shown in Fig. 2.

In the use of the device, it is attached to the cap 7 with the arms 13 extending therein and engaging the same. The device is therefore carried by the cap and when placing the cap upon the jar the device enters the neck of the jar. When the cap is screwed upon the neck the member 9 contacts with the fruits or vegetables and forces them downwardly and holds them below the level of the preserving liquid. By having the spring 12 suitably resilient, the member 9 will not crush or unduly bruise the fruit or vegetables as it is free to move upwardly. When the cap 7 is removed, it is obvious that the member 9 and associated elements move with it and this member may be separated from the cap when desired.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. An attachment for receptacles having a cover, comprising a depression member to enter the receptacle for holding down its contents, and a leaf spring secured to the cover and embodying spaced arms to engage with the interior of the cover, whereby the depression member is detachably secured to the cover for bodily movement therewith.

2. An attachment for receptacles having a cover, comprising a depression member to enter the receptacle for holding down its contents, and an approximately U-shaped leaf spring attached to the member and embodying upwardly converging arms for detachable engagement with the interior of the cover, whereby the depression member is detachably secured to the cover for bodily movement therewith.

3. An attachment for receptacles having a screw-threaded cover, comprising an apertured depression member to enter the receptacle for holding down its contents, and an approximately U-shaped leaf spring permanently attached at its transverse portion with the depression member and embodying curved resilient arms diverging away from the depression member and increasing in width outwardly with their large ends provided with curved edges adapted to enter the screw-threads of the cover, as and for the purpose specified.

In testimony whereof I affix my signature in presence of two witnesses.

GEORGE N. ARMSTRONG.

Witnesses:
 O. C. GORHAM,
 ARTHUR HAGGARD.

Copies of this patent may be obtained for five cents each, by addressing the "Commissioner of Patents, Washington, D. C."